A. MEYER.
APPARATUS FOR ROLLING WIRE GLASS.
APPLICATION FILED MAY 3, 1909.
952,126.
Patented Mar. 15, 1910.
2 SHEETS—SHEET 1.
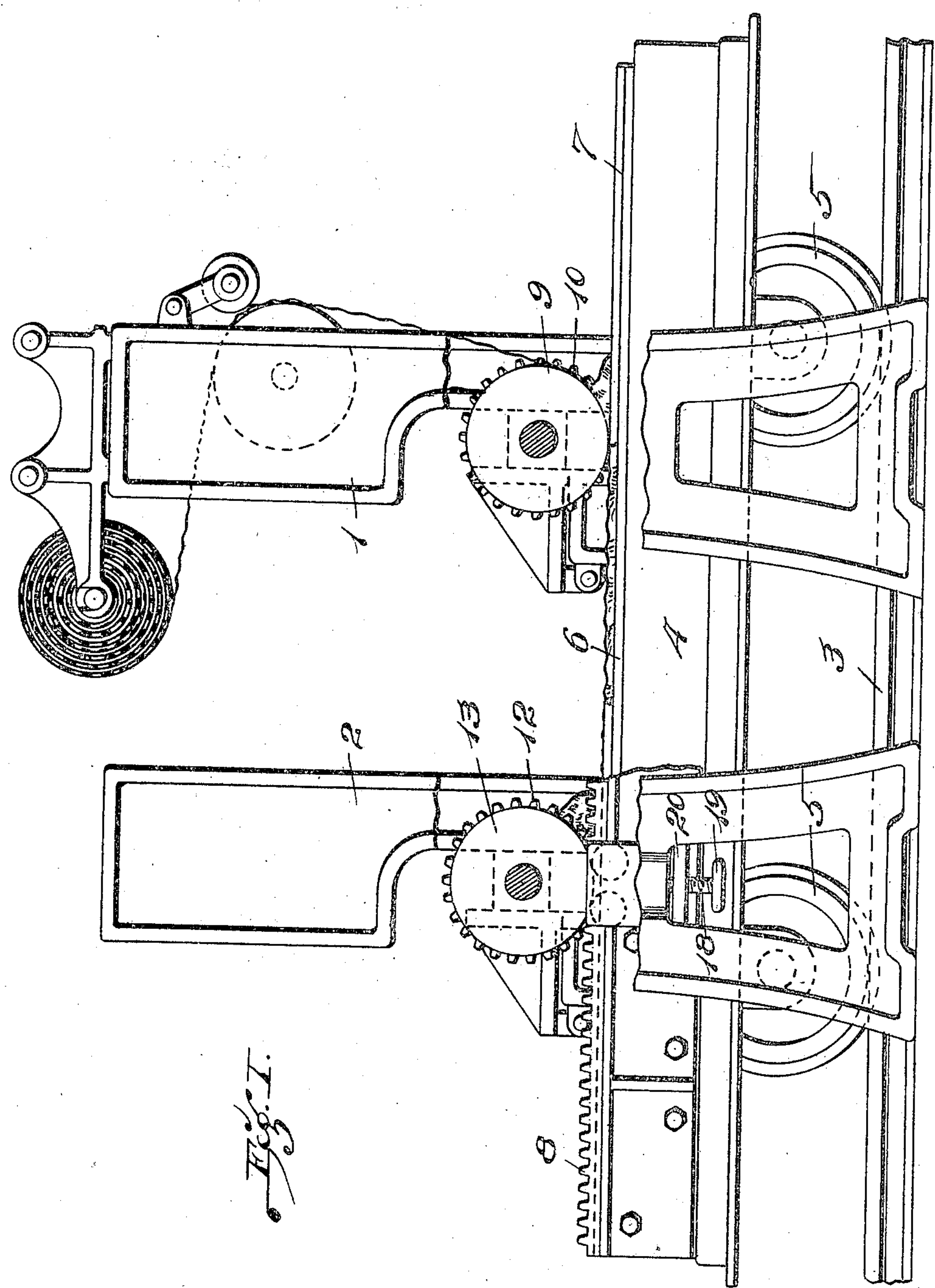
ATTEST.
E. M. Harrington
Wm. R. Scott.
INVENTOR.
ANTON MEYER.
BY E. S. Knight ATTY.

A. MEYER.
APPARATUS FOR ROLLING WIRE GLASS.
APPLICATION FILED MAY 3, 1909.
952,126.
Patented Mar. 15, 1910.
2 SHEETS—SHEET 2.
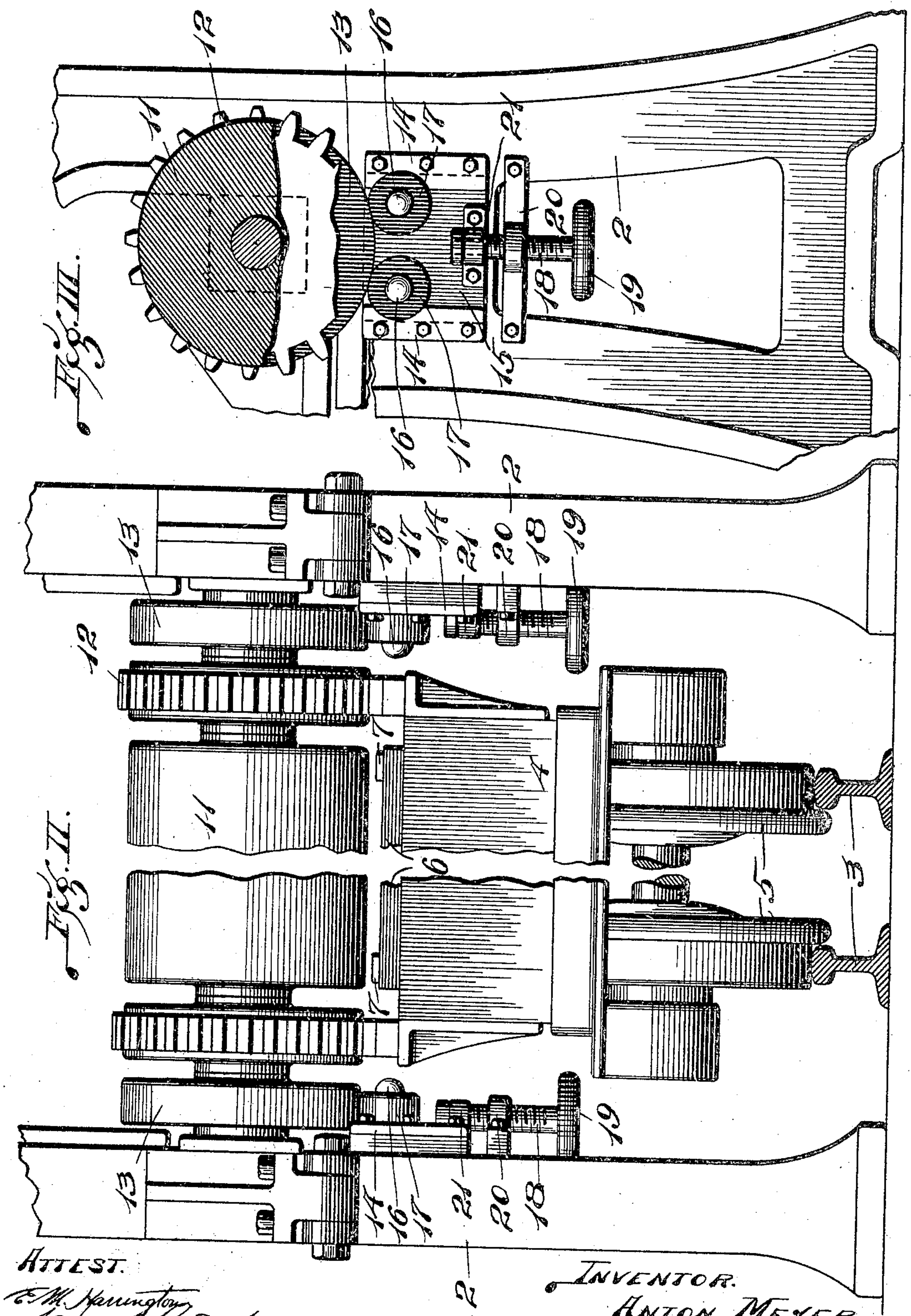

UNITED STATES PATENT OFFICE.

ANTON MEYER, OF ST. LOUIS, MISSOURI, ASSIGNOR TO MISSOURI WIRE AND ROLLED GLASS MANUFACTURING COMPANY, OF ST. LOUIS, MISSOURI, A CORPORATION.

APPARATUS FOR ROLLING WIRE-GLASS.

952,126. Specification of Letters Patent. Patented Mar. 15, 1910.

Application filed May 3, 1909. Serial No. 493,480.

*To all whom it may concern:*

Be it known that I, ANTON MEYER, a citizen of the United States of America, residing in the city of St. Louis and State of Missouri, have invented certain new and useful Improvements in Apparatus for Rolling Wire-Glass, of which the following is a full, clear, and exact description, reference being had to the accompanying drawings, forming part of this specification.

My invention relates to an apparatus for rolling what is commonly known as "wire glass;" or, in other words, plates of glass having embedded therein sheets of wire fabric. In rolling plates of glass of this description, it is necessary to first roll one layer of glass, apply the sheet of wire fabric above the layer of glass that has been rolled, and finally roll a second layer of glass onto the first layer above the sheet of wire fabric. In producing wire glass by following the procedure referred to, it is the usual practice to utilize a carriage having a table on which the glass is rolled, a leading roll operating above the table by which the first layer of glass is rolled, and which is coöperable with the carriage, and a following roll coöperable with the carriage located at a greater elevation than the leading roll, and which performs the office of rolling the second layer of glass. It has been the practice heretofore to support the leading and following rolls upon runway members common to both, carried by the table carriage, and to operate these rolls by means in part common to both of them carried by the table carriage; and further in order that the leading roll may operate more closely to the glass supporting table than the following roll to recess the end portions of the leading roll that operate upon the runway members. The recessing of the ends of the leading roll, for the purpose stated, has been found to be an objectionable feature in wire glass rolling apparatuses for the reason that it occasions a difference in the peripheral speed of travel between the central glass working body of the leading roll and the recessed supporting ends of the leading roll due to the difference in circumference between the glass working body and the supporting ends of the roll, as a result of which a dragging action of the working body of the leading roll upon the first layer of glass and consequent faulty production of said layer, such as would not be produced in the absence of said dragging action.

The prime object of my invention is to produce a glass rolling apparatus in which the leading roll and the following roll are supported independent of each other through the medium of the table carriage of the apparatus, and to provide for both the leading and following rolls partaking of the same peripheral speed at their glass working bodies as at the supporting portions, whereby dragging action of either roll upon the glass being worked is eliminated.

A further object of my invention is to provide adjustable supports for the following roll to permit its being upheld at various degrees of elevation in order that plates of glass of various thicknesses may be produced in the use of the apparatus.

Figure I is in part a side elevation and in part a vertical longitudinal section of my apparatus. Fig. II is an enlarged end elevation of the apparatus, with the central portions of the carriage and the following roll broken out. Fig. III is in part an elevation of one of the standards with which the following roll is associated, and one of the adjustable supports for the following roll, and in part a vertical cross section through the following roll, with a portion of said roll broken away.

In the accompanying drawings:—1 and 2 designate standards arranged in pairs located at the sides of my apparatus.

3 are track rails extending longitudinally between the pairs of standards, and 4 is a carriage having track wheels 5 that are operable upon the track rails. The carriage is provided with a table 6 that receives the glass to be rolled in the use of my apparatus, and on which are arranged trangs 7, extending longitudinally of said table. The carriage 4 has mounted thereon at its sides and extending longitudinally thereof rack bars 8.

9 designates a leading roll that is of uniform diameter throughout its length, and the end portions of which are arranged to ride upon the trangs 7. This leading roll is provided with spindles to which are fixed spur wheels 10 in engagement with the rack bars 8 in order that said roll may be rotated during travel of the carriage 4, and said spindles are mounted in suitable bearing boxes arranged for vertical movement in guideways in the standards 1.

11 designates a following roll having spindles that are mounted in bearing boxes loosely arranged for vertical movement in guideways in the standards 2, and to which spindles are fixed spur wheels 12 that are arranged in engagement with the rack bars 8, in order that rotation may be imparted to the following roll upon the movement of the carriage 4 in a manner similar to that in which movement is imparted to the leading roll upon the movement of said carriage. The spindles of the following roll also have fixed to them, adjacent to the standards 2, rollers 13 that are of diameters corresponding to the diameter of the following roll, thereby providing for the glass working body of the following roll and the rollers 13 partaking of the same peripheral speed during glass rolling operation, as will hereinafter more clearly appear.

14 designates vertical guides secured to the standards 2 at their inner sides and which are located approximately beneath the rollers 13 upon the spindles of the following roll 11.

15 are supporting plates loosely arranged between the guides 14 and adapted to be raised and lowered with an object in view to be presently made clear, and each supporting plate has fixed thereto a pair of studs 16 to which anti-friction rollers 17 are journaled. The anti-friction rollers just referred to occupy positions beneath the rollers 13 of the following roll and serve as supporting bearings for said rollers which operate thereon and are upheld in a manner to maintain the following roll at a desired elevation above the table of the carriage 4.

18 designates adjusting screws by which the supporting plates 15 are raised and lowered. These adjusting screws are provided at their lower ends with hand wheels 19, operate in bearing members 20 through which they pass, and have threaded engagement with ears or brackets 21 that are carried by these supporting plates. It will be apparent that when the adjusting screws are manipulated, the supporting plates may be raised and lowered to desired degrees, and that consequently the following roll supported through the medium of said plates may be placed at various degrees of elevation above the table of the carriage 4 and that the adjustment of elevation of the following roll may be quickly accomplished whenever occasion for a change in the elevation of the roll is desired.

I claim:—

1. In a glass rolling apparatus, a carriage having a glass receiving table, a leading roll above said table, means carried by said carriage upon which said leading roll rides, a following roll above said table having roller supporting portions corresponding in diameters to the diameter of the working body of the roll, and means independent of said carriage whereby the roller supporting portions of said following roll are supported.

2. In a glass rolling apparatus, a carriage having a glass receiving table, a leading roll above said table, means carried by said carriage upon which said leading roll rides, a following roll above said table having roller supporting portions corresponding in diameters to the diameter of the working body of the roll, and vertically adjustable means independent of said carriage for supporting the roller supporting portions of said following roll.

3. In a glass rolling apparatus, a carriage having a glass receiving table, a leading roll above said table, means carried by said carriage upon which said leading roll rides, a following roll above said table having roller supporting portions corresponding in diameters to the diameter of the working body of the roll, stationary members adjacent to said carriage, vertically adjustable supporting members fitted to said stationary members, and antifriction rollers carried by said adjustable supporting members upon which the roller supporting portions of the following roll rest.

4. In a glass rolling apparatus, a carriage having a glass receiving table, a leading roll above said table, means carried by said carriage upon which said leading roll rides, a following roll above said table having roller supporting portions corresponding in diameters to the diameter of the working body of the roll, stationary members adjacent to said carriage, vertically adjustable supporting members fitted to said stationary members, antifriction rollers carried by said adjustable supporting members upon which the roller supporting portions of the following roll rest, and means for adjusting said supporting members.

5. In a glass rolling apparatus, a carriage having a glass receiving table, a leading roll above said table, means carried by said carriage upon which said leading roll rides, a following roll above said table having roller supporting portions corresponding in diameters to the diameter of the working body of the roll, stationary members adjacent to said carriage, vertically adjustable supporting members fitted to stationary members, antifriction rollers carried by said adjustable supporting members upon which the roller supporting portions of the following roll rest, and adjusting screws mounted in said stationary members, whereby said supporting members may be raised and lowered.

ANTON MEYER.

In presence of—
H. G. COOK,
E. B. LINN.